Figure 1:
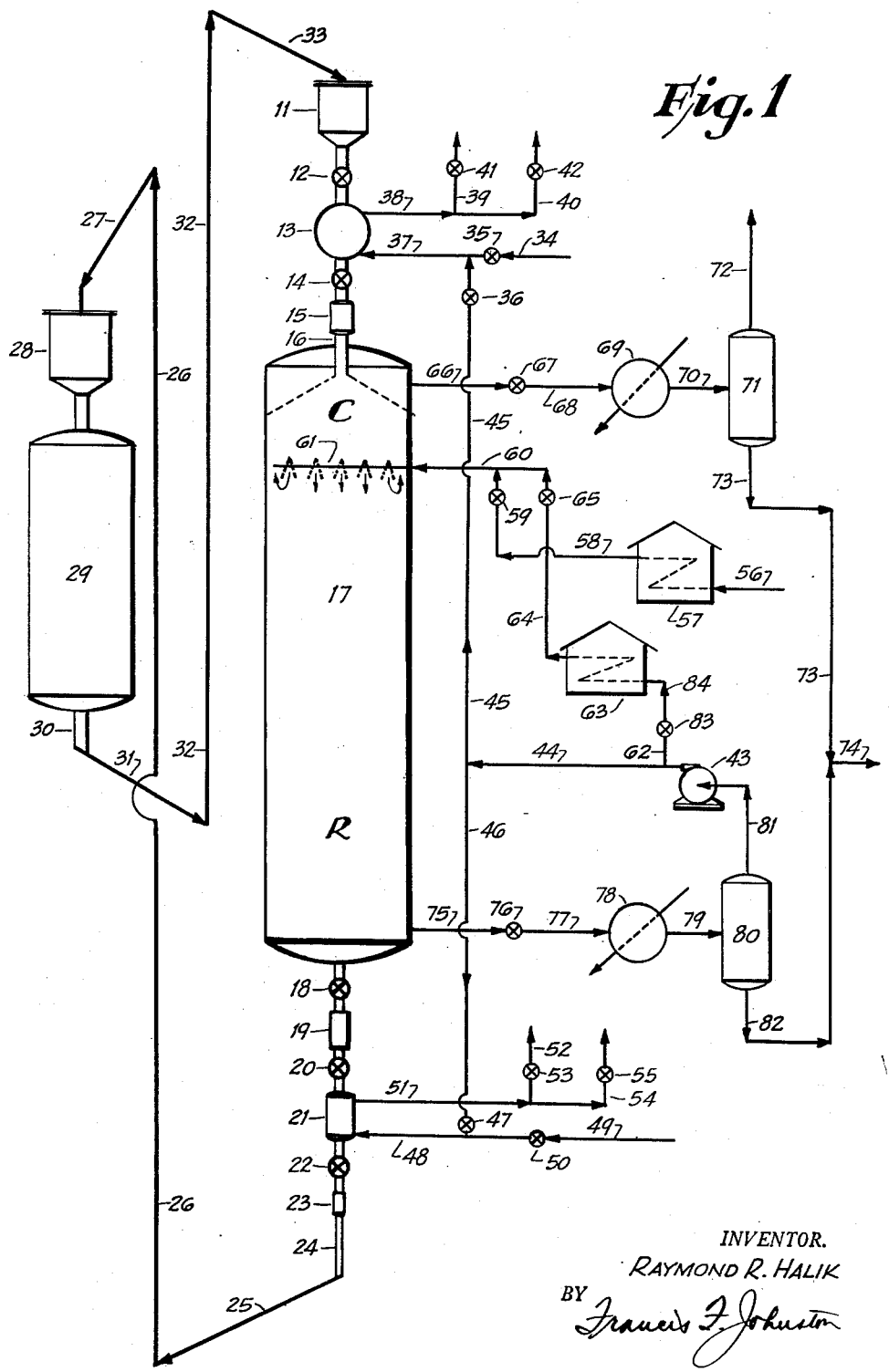

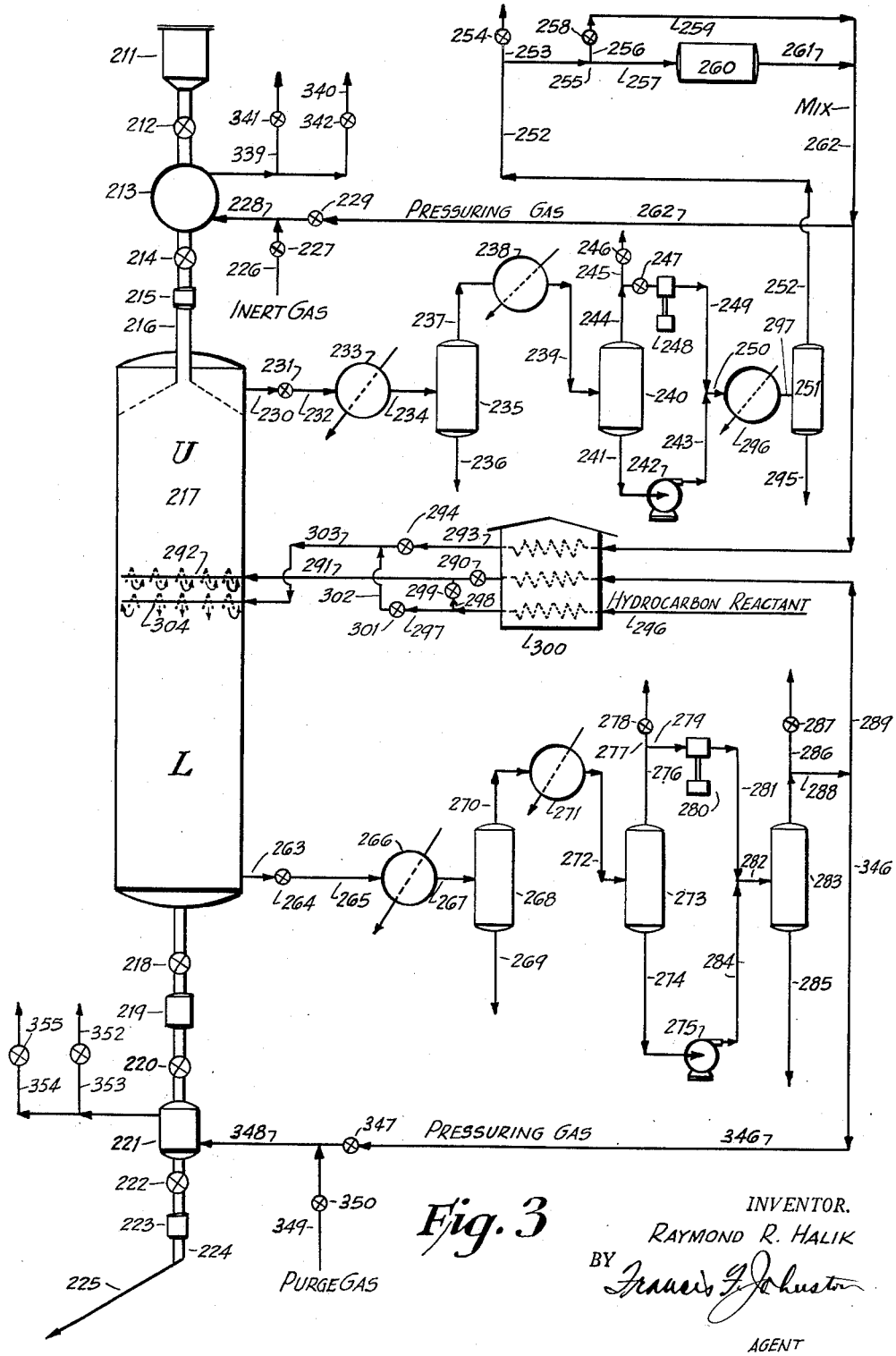

United States Patent Office 2,758,065
Patented Aug. 7, 1956

2,758,065

HYDROCARBON-RECYCLE GAS MOISTURE CONTROL

Raymond R. Halik, Oak Ridge, Tenn., assignor to Socony Mobil Oil Company, Inc., a corporation of New York Application August 15, 1952, Serial No. 304,487

4 Claims. (Cl. 196—50)

The present invention relates to reforming hydrocarbons and, more particularly, to reforming hydrocarbons in the presence of catalysts adversely affected by moisture.

It is well-known that the yield of reformate from a given charge stock under given reforming conditions of temperature and pressure, in the presence of some reforming catalysts, is adversely affected by the presence of more than about 0.5 to about 0.7 weight per cent water and/or loosely bound oxygen on the catalyst. It is questionable whether water, per se, is present on the catalyst or whether it is loosely bound oxygen which may be converted to water during the reforming action. At any rate, when the catalyst in the reforming zone contains an amount of water equivalent to more than about 0.5 to about 0.7 weight per cent of the catalyst, the yield is reduced. Consequently, several attempts have been made to overcome this difficulty among which may be mentioned pretreatment of the susceptible catalyst with hydrogen before contact with the hydrocarbon to be reformed. It has now been discovered that pure or substantially pure hydrogen need not be used, but that a mixture of recycle gas and hydrocarbon reactant can be used and that in accordance with the principles of the present invention all of the recycle gas need not be dried before re-use.

Before discussing the present invention, a definition of certain terms used herein will be given. Thus, reforming is a term used to designate one or more molecular changes which may occur separately or successively, individually designated as isomerization, dehydrogenation and dehydrocyclization. A hydrocarbon reactant is one hydrocarbon or a mixture of hydrocarbons all or some members of which are capable of undergoing any one or all of the aforesaid molecular changes. A reforming catalyst is an association of materials, usually oxides, which is capable of accelerating predominantly any one or all of the aforesaid molecular changes. Typical of the reforming catalysts in the presence of which the yield of reformate from a given hydrocarbon reactant under a given set of reforming conditions of temperature and pressure is adversely affected by the presence of water, per se, or potential water in excess of say 0.5 to about 0.7 weight per cent of the catalyst, are the chromia-alumina catalysts comprising at least 70 mol per cent alumina and 18 to 30 mol per cent chromia.

With a chromia-alumina reforming catalyst comprising at least 70 mol per cent alumina and 18 to 30 mol per cent chromia, the following conditions of temperature and pressure have been found to provide satisfactory results. Thus, the catalyst carrying in excess of about 0.5 to about 0.7 weight per cent water, in being, or potential water or water and/or loosely bound oxygen enters the reactor at a temperature of about 100° to about 1200°, preferably about 700° to about 1050° F. The vapor inlet temperature is about 100° to about 1100° and preferably about 900° to about 1060° F. The space velocity, i. e., the ratio of the volume of hydrocarbon reactant per hour to the volume of catalyst is about 0.1 to about 6.0 and preferably about 0.5 to about 2.5. The recycle gas ratio is about 1 to about 15, preferably about 4 to about 10 mols of recycle gas per mol of hydrocarbon reactant and the recycle ratio when employing hydrogen or a recycle gas containing about 25 per cent to about 80 per cent, preferably about 35 per cent to about 60 per cent hydrogen, balance $C_1$ to $C_6$ hydrocarbons is about 1 to about 8 mols, preferably about 2 to about 5 mols of hydrogen per mol of hydrocarbon reactant. When the hydrocarbon reactant is a mixture of hydrocarbons, the average molecular weight is determined in the usual manner from the A. S. T. M. distillation curve. The pressure in the reactor is about 15 to about 600 p. s. i. a. and preferably about 100 to about 300 p. s. i. a.

During passage through the reactor, a carbonaceous contaminant, coke, is deposited on the catalyst. This deposit deactivates the catalyst. The catalyst is reactivated or regenerated by burning the coke off in a stream of combustion supporting gas such as air in a kiln or regenerator. Regeneration of the catalyst is obtained at temperatures of about 600° to about 1400° F. and preferably at about 700° to about 1100° F. at pressures of about 15 to about 600 p. s. i. a. and preferably at about 15 to about 35 p. s. i. a.

Figure 2:
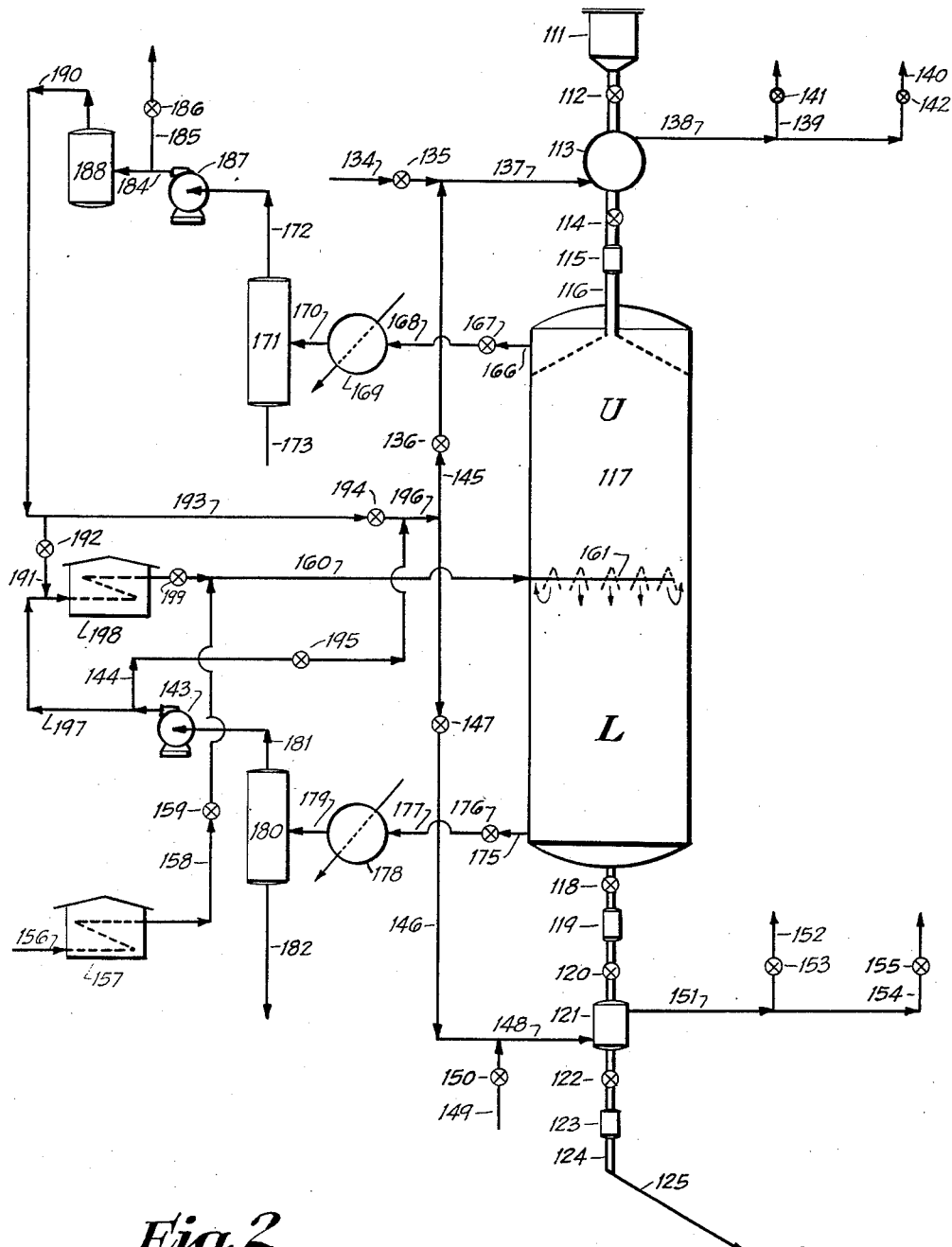

It is an object of the present invention to provide a method of reforming a hydrocarbon reactant in the presence of a catalyst, the yields from which are adversely affected by the presence of excessive amounts of water and/or loosely bound oxygen on the catalyst whereby optimum yields of reformate are obtained. It is another object of the present invention to provide a method of reforming a hydrocarbon reactant in the presence of a catalyst, the yield from which is adversely affected by the presence of excessive amounts of water and/or loosely bound oxygen wherein the catalyst containing said excessive amounts of water and/or loosely bound oxygen is contacted with a portion of the hydrocarbon reactant and recycle gas before contacting the major portion of the hydrocarbon reactant and recycle gas. It is a further object of the present invention to provide improved yields of reformate in the presence of a reforming catalyst whose usefulness is adversely affected by excessive amounts of water and/or loosely bound oxygen and to provide dry recycle gas without drying the total recycle gas wherein the reforming catalyst containing excessive amounts of water and/or loosely bound oxygen is contacted with a small portion of the hydrocarbon reactant and recycle gas prior to contact of the treated catalyst with the balance of the hydrocarbon reactant and recycle gas in which at least a portion of the wet gas is discarded and the balance dried. Other objects and advantages will become apparent to those skilled in the art from the following description taken in conjunction with the drawings, in which Figure 1 is a schematic flow sheet illustrating the conditioning of the catalyst containing excessive amounts of water and/or loosely bound oxygen with a small portion of the hydrocarbon reactant and recycle gas followed by discharge of the wet recycle gas from the system;

Figure 2 is a schematic flow sheet illustrating the conditioning of the catalyst containing excessive amounts of water and/or loosely bound oxygen with a portion of the hydrocarbon reactant and recycle gas in which a portion of the wet recycle gas is discharged from the system and the balance dried; and Figure 3 is a schematic flow sheet illustrating the conditioning of the catalyst containing excessive amounts of water and/or loosely bound oxygen with a portion of the hydrocarbon reactant and recycle gas in one of two zones in which a portion of the wet recycle gas is discharged from the system and the balance is used with or without drying with conditioned catalyst in the second zone and the dry recycle gas from the second zone is used to condition catalyst in the first zone.

Referring now to Figure 1, the course of the catalyst through the reactor and regenerator first will be followed and then the path of the hydrocarbon reactant, recycle gas and reformate will be traced.

Active catalyst containing an excessive amount of water and/or loosely bound oxygen, say in excess of about 0.5 to about 0.7 weight per cent based on the catalyst is placed in reactor feed bin 11. Since the reactor is at a higher pressure than feed bin 11, a reactor-sealing and solid-particle transfer means is provided to transfer the catalyst particles from bin 11 to reactor 17. While several means are known to the art, the one illustrated is a pressuring lock comprising gas-tight valves 12 and 14 and intermediate pressuring chamber 13. The reactor-sealing and solid-particle transfer means is operated in a cyclic manner as follows: Gas-tight valve 12 is opened and with gas-tight valve 14 closed, active catalyst flows into pressuring chamber 13 to a predetermined level. A purge gas, inert and/or non-flammable such as flue gas, is drawn from a source not shown through pipes 34 and 37 under control of valve 35 with valve 36 closed and chamber 13 and its contents purged. The purge gas is vented through pipes 38 and 40 with valve 41 closed and valve 42 open. Recycle gas compressed by compressor 43 flows through pipes 45 and 37 under control of valve 37 with valves 35, 41 and 42 closed into chamber 13 until the pressure therein is at least that of reactor 17 and preferably somewhat higher, say 5 to 10 p. s. i. Valve 36 is closed and gas-tight valve 14 opened. The catalyst flows into surge bin 15. When chamber 13 is empty of catalyst, valve 14 is closed completing the cycle. The catalyst flows from bin 15 through conduit 16 into reactor 17 as a substantially compact column of catalyst particles. The substantially compact column of catalyst particles flows downwardly through reactor 17 and during passage therethrough becomes contaminated with a carbonaceous deposit and deactivated. The catalyst leaves reactor 17 through catalyst flow control means 18 which can be of any suitable type, for example, a throttling valve. From the throttling means 18, the catalyst flows into surge bin 19 and thence into a reactor-sealing and solid-particle transfer means such as the depressuring lock comprising gas-tight valves 20 and 22 and intermediate depressuring chamber 20.

The depressuring lock, like the pressuring lock is operated in a cyclic manner. Thus, with gas-tight valves 20 and 22 closed, depressuring chamber 21 is purged with an inert and/or non-flammable gas, such as flue gas, drawn from a source not shown, through pipes 49 and 48 under control of valve 50 with valve 47 closed. The purge is vented through pipes 51 and 54 under control of valve 55 with valve 53 closed. Valves 50 and 55 are closed and pressuring gas such as recycle gas under pressure, impressed by compressor 43, flows through pipes 44, 46 and 48 under control of valve 47 into chamber 21 to a predetermined level. Gas-tight valve 20 is then closed and the pressure in chamber 21 reduced to that of the kiln 29 by venting the vapors through pipes 51 and 52 under control of valve 53. A purge gas such as flue gas is drawn through pipes 49 and 48 with valve 50 open and valve 47 closed and vented through pipes 51 and 54 with valve 55 open and valve 53 closed. When chamber 21 and the contents thereof has been purged, gas-tight valve 22 is opened and the catalyst flows into surge bin 23. This completes the cycle.

The catalyst flows from surge bin 23 through conduit 24 to chute 25 and thence to any suitable catalyst transfer means 26 such as a gas-lift and the like or an elevator such as a bucket elevator.

The catalyst transfer means elevates the deactivated catalyst to the feed hopper 28 of kiln 29 through chute 27.

Kiln or regenerator 29 is of any suitable type whereby the carbonaceous contaminant can be burned-off in a stream of combustion-supporting gas such as air at temperatures of about 600° to about 1400° F. and preferably at about 700° to about 1100° F. at pressures of about 15 to about 600 p. s. i. a. and preferably at about 15 to about 35 p. s. i. a.

The catalyst flows downwardly through kiln or regenerator 29 as a substantially compact column. During the passage through kiln 29 the coke is burned-off and the reactivated catalyst leaves kiln 29 through conduit 30. The reactivated catalyst flows along chute 31 to a catalyst transfer means 32 of any suitable type such as a gas-lift and the like or an elevator such as a bucket elevator by means of which the catalyst is transferred to reactor feed bin 11. This completes the catalyst cycle.

The hydrocarbon reactant, i. e., a single hydrocarbon or a mixture of hydrocarbons or a mixture of hydrocarbons containing hydrocarbons capable of undergoing at least one of the molecular changes designated as isomerization, dehydrogenation and dehydrocyclization, is drawn from a source not shown through line 56, heated in furnace 57 to at least a catalytic reforming temperature but below a thermal reforming temperature and flows into line 58. A recycle gas containing less than about 25 per cent hydrogen or a recycle gas containing about 25 to about 80 per cent, preferably about 35 to about 60 per cent, hydrogen is pumped by compressor 43 through pipes 44 and 62 under control of valve 83 and pipe 84 to furnace 63. In furnace 63 the recycle gas is heated to a temperature such that when mixed with the heated hydrocarbon reactant in the ratio of about 1 to about 15, preferably about 4 to about 10, mols of recycle gas per mol of hydrocarbon reactant, or when mixed with the heated hydrocarbon reactant in the ratio of about 1 to about 8, preferably about 2 to about 5 mols of hydrogen per mol of hydrocarbon reactant to form a charge mixture, the charge mixture shall have a temperature of about 800° to about 1100° F. and preferably about 900° to about 1060° F.

Since it is the purpose of the present invention to provide a means of conditioning the catalyst to obtain optimum yields of reformate in the presence of reforming catalysts containing excessive amounts of water and/or potential water or water and loosely bound oxygen by contacting the unconditioned active catalyst with controlled amounts of recycle gas and hydrocarbon reactant, provision is made whereby the controlled amounts of recycle gas and hydrocarbon reactant flow upwardly from the gas and reactant inlet and the balance of the gas and reactant flow downwardly. As illustrated in Figure 1, provision is made to pass an amount of recycle gas equivalent to the net gas make of the reaction together with about 2 to about 20 per cent of the hydrocarbon reactant upwardly from the gas-reactant distributor 61 and the balance of the recycle gas and reactant downwardly. During contact of the recycle gas and hydrocarbon reactant with the active water containing unconditioned catalyst in zone C above recycle gas-reactant distributor 61, the water and/or loosely bound oxygen contained in the catalyst is removed preferably in amount sufficient to reduce the water and/or loosely bound oxygen to not more than about 0.5 to about 0.7 weight per cent based on the catalyst.

Distribution of the recycle gas and hydrocarbon reactant between zones C and R in reactor 17 is controlled by throttling means controlling the passage of effluent through lines 66 and 75 as described hereinafter.

The hydrocarbon reactant heated in furnace 57 flows through line 58 under control of valve 59 to line 60. Recycle gas heated in furnace 63 flows through pipe 64 under control of valve 65 to line 60. The heated hydrocarbon reactant and heated recycle gas mix in line 60 and enter reactor 17 through distributor 61 from which a portion of the charge mixture flows upwardly through zone C and leaves the reactor 17 via line 66 under control of valve 67 to line 68 heat exchangers, not shown, condenser 69 wherein that portion of the reactor effluent boiling above about 100° to about 125° F. is condensed. The uncondensed and condensed portions of the effluent pass through line 70 into gas-liquid separator 71 wherein the uncondensed portion of the effluent is vented through pipe 72 and the condensed portion of the effluent withdrawn through lines 73 and 74 to after-treatment, fractionation, storage and/or distribution.

The balance of the heated charge mixture flows downwardly from distributor 61 concurrent with the downwardly flowing substantially compact column of catalyst particles and leaves the reactor via line 75 under control of throttle valve 76, passes through one or more heat exchangers not shown and line 77 to condenser 78 wherein those constituents of the effluent boiling above about 100° to about 125° F. are condensed. The uncondensed and condensed portions of the effluent flow through line 79 to gas-liquid separator 80 from which the condensed portion of the effluent is withdrawn via line 82 to line 74 and thence to after-treatment, fractionation, storage and/or distribution.

Since the catalyst has been conditioned in zone C of the reactor, the effluent from zone R of reactor 17 is dry with respect to moisture. Therefore, the uncondensed portion of the effluent from zone R is withdrawn from gas-liquid separator 80 through pipe 81 and compressor 43 for recycle without drying.

Throttle valve 67 in line 66 is set to pass an amount of recycle gas equivalent to the total net make of gas in the reactor and in addition, about 2 to about 20, preferably about 5 to about 15, per cent of the hydrocarbon reactant. Throttle valve 76 in line 75 is set to pass the balance of the recycle gas, total net make gas and the balance of the hydrocarbon. The throttle valves are under control of a pressure differential means which regulates the pressure at valve 67 to be in excess of the pressure at valve 76 by the back pressure of the column of catalyst between distributor 61 and reactor outlet 75. The throttle valves and the pressure differential control are both represented by valves 67 and 76.

In Figure 2 is illustrated in a diagrammatic manner, the method of reforming a hydrocarbon reactant wherein an amount of recycle gas equivalent to more than the total net make gas flows upwardly counter-current to the downwardly flowing substantially compact column of catalyst particles, the amount of recycle gas equivalent to the total net gas make is vented from the recycle gas system and the balance of the gas from the upper portion U of reactor 117 is dried while the recycle gas from the lower section L of reactor 117 is dry with respect to moisture and hence requires no drying.

The operation of reactor 117 is similar to that of reactor 17. Thus, active catalyst in reactor feed bin 111 flows through a reactor-sealing and catalyst-transfer means into a surge bin and thence to the reactor. The reactor-sealing and solid-particle transfer means illustrated in Figure 2 is a pressuring lock comprising gas-tight valves 112 and 114 and intermediate pressuring chamber 113. The pressuring lock is operated in a cyclic manner as follows: Gas-tight valve 114 is closed and gas-tight valve 112 opened. Catalyst flows from bin 111 into pressuring chamber 113 to fill the chamber to a predetermined level. Chamber 113 and its contents are purged with an inert and/or non-flammable gas such as flue gas drawn from a source not shown through pipes 134 and 137 under control of valve 135 with valve 136 closed and vented through pipes 138 and 140 under control of valve 142 with valve 141 closed. After purging, valves 142 and 135 are closed and pressuring gas such as recycle gas flows under pressure of compressors 143 and 187 through pipes 145 and 137 into chamber 113 until the pressure therein is at least equal to and preferably somewhat higher, say 5 to 10 p. s. i., than the pressure in reactor 117. Valve 136 is closed and gas-tight valve 114 opened.

The catalyst flows from chamber 113 into surge bin 115. When chamber 113 is emptied of catalyst, gas-tight valve 114 is closed and the residual gas in chamber 113 vented through pipes 138 and 139 under control of valve 141. This completes the cycle.

The catalyst flows from surge bin 115 through conduit 116 into and downwardly through reactor 117 as a substantially compact column of catalyst particles. During its passage through reactor 117, the catalyst becomes contaminated with a carbonaceous deposit which deactivates the catalyst. The deactivated catalyst flows from reactor 117 through catalyst flow control means 118 of any suitable type such as a throttle valve into surge bin 119.

Since the reactor is operated at a higher pressure than the kiln or regenerator not shown, the reactor is provided with a reactor-sealing and solid-particle transfer means such as the depressuring lock comprising gas-tight valves 120 and 122 and intermediate depressuring chamber 121. Of course, when the kiln is operated at the same pressure as the reactor, the reactor-sealing means may be omitted.

The reactor-sealing and solid-particle transfer means is operated in a cyclic manner as follows: With valves 120 and 122 closed, the pressure in chamber 121 is brought to that of reactor 117 by introducing a suitable pressuring gas such as recycle gas into the chamber until the pressure is at least substantially equal to that in reactor 117. Thus, recycle gas under pressure impressed by one or both compressors 143 and 187 flows through pipes 146 and 148 under control of valve 147 with valves 150 and 153 and 155 closed into chamber 121 until the pressure is at least equal to that in surge bin 119. Gas-tight valve 120 is opened and catalyst flows into chamber 121 until the chamber is filled to a predetermined level. Gas-tight valve 120 is closed and valve 153 opened and chamber 121 vented through pipes 151 and 152 until the pressure in chamber 121 is equivalent to that of the regenerator. The contents of chamber 121 is then urged with an inert and/or non-flammable gas such as flue gas drawn from a source not shown through pipes 149 and 148 under control of valve 150 with valve 147 closed and the purge vented through pipes 151 and 154 under control of valve 155 with valve 153 closed. Gas-tight valve 122 is opened and the contents of chamber 121 flows into surge bin 123. When chamber 121 is empty of catalyst, gas-tight valve 122 is closed completing the cycle.

The catalyst flows from surge bin 123 through conduit 124 and chute 125 to a catalyst transfer means not shown of any suitable type such as a gas-lift and the like, an elevator, etc., by means of which the catalyst is transferred to a kiln or regenerator in which the carbonaceous deposit is burned-off in a stream of combustion-supporting gas such as air and the reactivated catalyst returned to reactor feed bin 111.

The method of reforming a hydrocarbon reactant diagrammatically illustrated in Figure 2 provides for passing an amount of recycle gas in excess of the total net gas make in addition to a portion of the hydrocarbon reactant through the upper zone of the reactor. Thus, a hydrocarbon reactant, for example—a straight run naphtha, a cracked naphtha or a mixture of straight run and cracked naphtha, is drawn from a source not shown through line 156 and heated in furnace 157 to a temperature not greater than a thermal reforming temperature. Recycle gas compressed by compressor 187 flows through pipe 184, drier 188 and pipe 190 to pipe 193 and thence through pipe 191 under control of valve 192 to pipe 197. Recycle gas compressed by compressor 143 flows through pipe 197 and is mixed with recycle gas from pipe 191 and the mixed recycle gas heated in furnace 198 to a temperature such that when mixed with heated hydrocarbon reactant in line 160 in the ratio of about 1 to about 15, preferably about 4 to about 10, mols of recycle gas, or about 1 to about 8, preferably about 2 to about 5, mols of hydrogen per mol of heated hydrocarbon reactant to form a charge mixture, the charge mixture has a temperature of about 800° to about 1100° F., preferably about 900° to about 1060° F. The heated recycle gas flows from furnace 198 into line 160 under control of valve 199.

The heated charge mixture flows through line 160 to distributor 161 from whence the recycle gas and hydrocarbon reactant flows partially upwardly counter-current to the downwardly flowing substantially compact column of catalyst particles and partially downwardly concurrent with the downwardly flowing substantially compact column of catalyst particles in a proportion controlled by throttling means provided on effluent lines 166 and 175.

The hydrocarbon reactant and recycle gas leaves distributor 161 and a portion of the mixture containing an amount of recycle gas in excess of the total net gas make flows upwardly in contact with the downwardly flowing substantially compact column of catalyst to leave reactor 117 through line 166 under control of throttling means 167 which in turn is controlled by a pressure differential control of suitable type whereby the pressure on line 166 is sufficiently in excess of the pressure maintained on line 175 to counter-balance the difference in back pressure of the columns of catalyst in zones U and L. The throttling valve 167 is set to pass an amount of effluent containing an amount of recycle gas in excess of the total net gas make and an amount of reformate equivalent to a substantial portion of the hydrocarbon reactant introduced into reactor 117.

The effluent flows through line 168 and one or more heat exchangers to condenser 169 wherein those constituents of the effluent from zone U boiling above about 100° to about 125° F. are condensed while the lower boiling constituents of the effluent together with the water removed from the catalyst are uncondensed. From condenser 169 the effluent flows through line 170 to gas-liquid separator 171 where the condensed portion of the effluent is withdrawn to after-treatment, fractionation and the like, storage and/or distribution through line 173.

The uncondensed constituents of the effluent and water vapor from the catalyst flow from separator 171 through pipe 172 to compressor 187. The compressed vapors flow from compressor 187 through pipe 184 from which is bled off through pipe 185 under control of valve 186 an amount of vapor equivalent to the total net gas make. The balance of the vapors flow through pipe 184 to drier 188 and thence through pipe 190 to pressuring chamber 113, depressuring chamber 121 or distributor 161 as needed.

It will be noted that only the portion of the recycle gas in excess of the amount equivalent to the total net gas make is dried in drier 188. It will also be noted that substantially all of the water is removed from the catalyst by the vapors leaving reactor 117 through line 166. Consequently, it is unnecessary to dry the uncondensed vapors from the lower zone L of reactor 117.

That portion of the recycle gas and the hydrocarbon reactant which does not flow upwardly from distributor 161 flows downwardly concurrently with the downwardly flowing substantially compact column of catalyst. The effluent from zone L leaves the reactor 117 through line 175 under control of throttling means 176 and flows through line 177 and heat exchangers not shown to condenser 178 wherein the constituents of the effluent boiling above about 100° to about 125° F. are condensed.

The condensate and uncondensed gases flow along line 179 to gas-liquid separator 180 from which the condensate is withdrawn to after-treatment, fractionation, storage and/or distribution through line 182. The substantially dry (with respect to water) gas flows from separator 180 through pipe 181 to compressor 143 from which, by pipes 144 and 197, the compressed recycle gas flows to pressuring chamber 113, depressuring chamber 121 or furnace 198 as required.

In Figure 3 is diagrammatically illustrated a method of reforming a hydrocarbon reactant such as a naphtha in which the dry gas from the lower zone L of the reactor is recycled to the upper zone U of the reactor and the recycle gas from the upper zone U of the reactor is recycled to the lower zone L of the reactor. Thus, active catalyst in reactor feed bin 211 flows through the reactor-sealing and solid particle transfer means comprising gas-tight valves 212 and 214 and intermediate pressuring chamber 213 into surge bin 215. The reactor-sealing and solid-particle transfer means is operated in a cyclic manner as described in conjunction with Figures 1 and 2. From surge bin 215, the catalyst flows through conduit 216 into reactor 217. The catalyst flows downwardly as a substantially compact column through reactor 217 and the deactivated catalyst leaves reactor 217 through catalyst flow control means 218 of any suitable type such as a throttling valve and flows into surge bin 219. From surge bin 219 the catalyst passes through a reactor-sealing and solid-particle transfer means such as a depressuring lock comprising gas-tight valves 220 and 222 and intermediate depressuring chamber 221. This reactor-sealing and solid-particle transfer means operates in a cyclic manner as described in conjunction with Figures 1 and 2. The depressurized, purged, deactivated catalyst flows into surge bin 223 and thence through conduit 224 and chute 225 to a catalyst transfer means, not shown, which can be a gas-lift or the like, an elevator, etc.

The catalyst is transferred to a kiln or regenerator, not shown, wherein during passage therethrough the catalyst is reactivated by burning off a carbonaceous deposit in a stream of combustion-supporting gas such as air at temperatures of about 600° to about 1400° F. and preferably about 700° to about 1100° F. The reactivated catalyst is transferred from the kiln or regenerator to reactor feed bin 211 by a solid-particle transfer means of any suitable type such as a gas-lift, etc.

Hydrocarbon reactant, for example—a naptha—is drawn from a source, not shown, through line 296 and heated in furnace 300 to a temperature below a thermal reforming temperature. The heated hydrocarbon reactant flows from furnace 300 through line 297 and a portion thereof under control of valve 301, flows through line 302 to line 303 wherein it is mixed with recycle gas from zone U which has been heated in furnace 300 to a temperature such that when mixed in the ratio of about 1 to about 15, preferably about 4 to about 10, mols of recycle gas or about 1 to about 8, preferably about 2 to about 5, mols of hydrogen per mol of hydrocarbon reactant, the average molecular weight of which has been determined in the usual manner from the A. S. T. M. distillation curve, the mixture thus formed has a temperature of about 800° to about 1100° F. and preferably about 900° to about 1060° F.

Another portion of the heated hydrocarbon reactant flows through line 298 under control of valve 299 to line 291 where it is mixed with recycle gas from zone L in the ratio of about 1 to about 15, preferably about 4 to about 10, mols of recycle gas or about 1 to about 8, preferably about 2 to about 5, mols of hydrogen per mol of hydrocarbon reactant, the average molecular weight of which is determined in the usual manner as noted hereinbefore.

The heated hydrocarbon reactant together with heated recycle gas drawn from zone L flows through line 291 to distributor 292 from which the mixture flows upwardly counter-current to the downwardy flowing substantially compact column of catalyst particles. The heated hydrocarbon reactant together with recycle gas drawn from zone U flows through line 303 to distributor 304 from which the mixture flows downwardly concurrent with the downwardly flowing substantially compact column of catalyst particles.

The flow of reactant and recycle gases upwardly from distributor 292 and downwardly from distributor 304 is regulated by throttling means under differential pressure control in effluent lines 230 and 263 respectively. The throttling means which can be of any suitable type such as a throttle valve is set to pass a predetermined volume of vapor, i. e., reactant, reformate and gas, including reycle gas through throttle valve 231 in line 230 and make gas with the balance passing through throttling device 264 in line 263. The pressure differential control device is set for any suitable difference in pressure between lines 230 and 263, greater than the difference in back pressure of the column of catalyst above distributor 292 and the back pressure of the column of catalyst below distributor 304. This excess of pressure usually is of the order of about ½ to about 5 p. s. i.

The flow of reactant, reformate, recycle gas and make gas from zone U is controlled to permit an amount of gas to pass through line 230 equivalent to a portion of the recycle gas introduced into the reforming zone plus an amount of gas in excess of the total net gas make. Thus, assuming an operation in which 50 per cent of the reactant to be reformed enters the reactor through line 291 and distributor 292, 50 per cent of the recycle gas will enter the reactor through distributor 292. Accordingly, throttling device 231 will be set to pass vapors equivalent to the aforesaid 50 per cent of reactant plus the aforesaid 50 per cent of the recycle gas plus an amount of gas in excess of the total net gas make. On the other hand, throttling means 264 will be set to pass the balance of the vaporous contents of the reactor.

The effluent from zone U passes through line 230 under control of throttling means 231 and passes through line 232 to heat exchangers not shown and condenser 233 where the effluent is cooled to a temperature at the operating pressure at which constituents thereof boiling in the range of about 400° to about 425° F., at 15 p. s. i. a. are condensed, thence through line 234 to gas-liquid separator 235 where the condensate is removed through line 236 to after treatment fractionation, storage and/or distribution.

The uncondensed constituents of the effluent, are vented from gas-liquid separator 235 through line 237 to condenser 238. The condensate and uncondensed effluent from condenser 238 flow through line 239 to gas-liquid separator 240 wherein the condensate is separated and withdrawn through line 241 to pump 242 and discharged through line 243 to line 250. The uncondensed constituents of the effluent are vented from separator 240 through pipe 244 from which, when desired, an amount of gas equal to the excess of the net gas make is vented together with entrained moisture from the catalyst through pipe 245 under control of valve 246. The balance of the uncondensed constituents of the effluent passes under control of valve 247 to compressor 248 by which it is compressed to a pressure somewhat higher than that of the reactor and discharged through pipe 249 into line 250 where it mixes with the condensed constituents of the effluent.

The mixture flows through line 250 to condenser 296 and via line 297 to gas-liquid separator 251 from which the condensate is separated and withdrawn through line 295 to after-treatment, fractionation, storage and/or distribution.

The uncondensed constituents of the effluent, flow from separator 251 through pipe 252. When recycle gas in sufficient quantity or when no recycle gas has been vented through pipe 245, an amount equivalent to the excess of the total net gas make can be bled off through line 253 under control of valve 254.

The balance of the recycle gas flows through pipe 255 to pass, wholly or in part, through drier 260 of any suitable type wherein the dew-point of the recycle gas is lowered to about 40° to 50° F. or lower, and thence through pipe 261 to pipe 262 to furnace or heater 300. Usually only that portion of the recycle gas will be dried in dryer 260 necessary to provide a recycle gas in pipe 262 having a moisture content not adversely affecting the yield of reformate in the presence of relatively dry catalyst in zone L. The balance of the recycle gas by-passes dryer 260 and flows through pipes 256 and 259 under control of valve 258 to pipe 262.

The recycle gas, having a moisture content not adversely affecting the yield of reformate in the presence of relatively dry catalyst in zone L, flows through pipe 262 to furnace or heater 300 where it is heated to a temperature such that, when mixed with heated hydrocarbon reactant in line 303 in the ratio of about 1 to about 15 mols, preferably about 4 to about 10 mols, of recycle gas or about 1 to about 8, preferably about 2 to about 5 mols of hydrogen per mol of hydrocarbon reactant, the charge mixture so produced enters reactor 217 at a temperature of about 800° to about 1080° F., preferably about 900° to about 1060° F.

The heated recycle gas flows along pipe 293 under control of valve 294 into line 303. Hydrocarbon reactant drawn from a source, not shown, through line 296 is heated in furnace 300, flows along line 297 under control of valve 301 through line 302 to line 303 where it is mixed with the recycle gas from zone U to form a charge mixture. The charge mixture so formed flows along line 303 and is distributed over the cross-section of lower zone L containing dry particle-form catalyst by distributor 304. The balance of the heated hydrocarbon reactant flows from line 297 through line 298 under control of valve 299 to line 291 where it mixes with the gas therein in the ratio of about 1 to about 15, preferably about 4 to about 10, mols of recycle gas or about 1 to about 8 mols, preferably about 2 to about 5 mols of hydrogen per mol of hydrocarbon reactant to form a charge mixture which flows along line 291 to distributor 292. The charge mixture flows upwardly from distributor 292 through zone U in contact in the upper portion thereof with wet catalyst, i. e., containing more than about 0.5 to about 0.7 weight per cent water and/or loosely bound oxygen and leaves reactor 217 via line 230 under control of throttling means 231.

The effluent flows from lower zone L through line 263 under control of regulating means of any suitable type such as throttle valve 264 through heat exchangers and the like, not shown, to line 265. The effluent flows through line 265 to condenser 266 where the effluent is cooled to a temperature at the operating pressure at which constituents thereof boiling in the range of about 400° to about 425° F., at 15 p. s. i. a. are condensed; thence through line 267 to gas-liquid separator 268 where the condensate is removed through line 269 to after-treatment, fractionation, storage and/or distribution.

The uncondensed constituents of the effluent are vented from gas-liquid separator 268 through line 270 to condenser 271. The condensate and uncondensed effluent from condenser 271 flow through line 272 to gas-liquid separator 273 wherein the condensate is separated and withdrawn through line 274 to pump 275 and discharged through line 284 to line 282. The uncondensed constituents of the effluent are vented from separator 273 through pipe 276 from which, when desired, an amount of gas equal to the excess of the net gas make is vented through pipe 277 under control of valve 278, the balance or all of the uncondensed constituents vented from separator 273 through pipe 276 pass through pipe 279 to compressor 280 by means of which the uncondensed effluent is pressured to a pressure at least equal to that of reactor 217 and flows through pipe 281 to line 282 and thence to liquid-gas separator 283. The condensate separates in separator 283 and is withdrawn through line 285 to after-treatment, fractionation, storage and/or distribution. The uncondensed effluent in separator 283 is vented through pipes 286 and 288 to pipe 346 through which it flows to furnace 300 to be used as recycle gas. When desired, a portion of the uncondensed effluent from separator 283 can be vented therefrom through pipe 286 under control of valve 287.

In summation, a method is diagrammatically illustrated in Figure 3 wherein substantially all of the water and/or loosely bound oxygen contained in the catalyst is removed in zone U by the recycle gas and hydrocarbon reactant, only a portion, if any, of the recycle gas is dried and the dry recycle gas from zone U is returned to zone L of the reactor thus providing a dry recycle gas for use in zone L. On the other hand, recycle gas from zone L which is dry, i. e., has a dew-point not higher than 40° F., is passed to zone U for use therein to remove moisture from the incoming catalyst.

Since the water appearing in the effluent gases of zone U is not all present in catalyst as water, per se, the source of the water present in the effluent gases from zone U has been said to be water and/or loosely bound oxygen present in or associated with the catalyst. Accordingly, when speaking of the moisture content of the fresh or active catalyst entering the reactor in the upper part of zone U, it is intended to so characterize that constituent or those constituents of the catalyst entering zone U which, upon contact of the catalyst with recycle gas and hydrocarbon reactant, causes or cause the appearance of water in the zone effluent.

The foregoing description of the present invention is that of a method of reforming a hydrocarbon reactant comprising hydrocarbons capable of undergoing one or all of the molecular changes known as isomerization, dehydrogenation, and dehydrocyclization individually or successively in the presence of particle-form solid contact mass material in which the moisture content of the catalyst is controlled to ensure optimum yield of a reformate of given octane number from a given charge stock under the reforming conditions of temperature and pressure existing in the reactor wherein the active catalyst is contacted with a portion of the hydrocarbon reactant and an amount of recycle gas at least equivalent to and preferably in excess of the total net gas make in the first zone in which the active catalyst enters the reactor and drying at most only a part of the recycle gas from said first zone whereby dry recycle gas, i. e., recycle gas having a dew-point not greater than 40° F. or carrying insufficient water to adversely affect the yield of reformate is supplied to both the first and second zones of the reactor through which the catalyst passes successively.

I claim:

1. A method of reforming hydrocarbons which comprises in a cyclic manner introducing particle-form solid reforming catalyst containing in excess of 0.5 to 0.7 weight per cent of at least one of water and loosely bound oxygen into a first reaction zone of a plurality of reaction zones under reforming conditions of temperature and pressure, flowing said catalyst downwardly through said first reaction zone from the point of introduction to a catalyst outlet in said first reaction zone, introducing into said first reaction zone near said catalyst outlet about 2 to about 20 per cent of a completely vaporized charge stock, comprising hydrocarbons to be reformed, together with an amount of a hydrogen-containing dry recycle gas (obtained as hereinafter set forth) about equivalent to the net amount of hydrogen-containing gas produced in said first reaction zone and a second reaction zone, flowing said completely vaporized charge stock and said recycle gas upwardly in contact with said downwardly flowing catalyst through said first reaction zone to produce a dry catalyst containing not more than 0.5 to 0.7 weight per cent of at least one of water and loosely bound oxygen and to produce a first reaction zone vaporous effluent comprising hydrocarbons boiling at about 400° to 425° F., water and recycle gas, introducing said dry catalyst into a second reaction zone, contacting in said second reaction zone said dry catalyst with the balance of said completely vaporized charge stock and the balance of said hydrogen-containing recycle gas (obtained as hereinafter set forth) to produce a second reaction zone vaporous effluent comprising hydrocarbons boiling at about 400°–425° F., said recycle gas and net hydrogen produced therein and concomitantly depositing coke on said catalyst, transferring said catalyst and deposited coke to a regenerator, burning-off at least a portion of said coke in said regenerator to produce reactivated catalyst containing in excess of 0.5 to 0.7 weight per cent of at least one of water and loosely bound oxygen, returning said reactivated catalyst to said first reaction zone, cooling said first reaction zone vaporous effluent to condense hydrocarbons boiling at about 400° to 425° F., separating condensed hydrocarbons from uncondensed first reaction zone vaporous effluent, discharging said uncondensed first reaction zone vaporous effluent from the system, cooling said second reaction zone vaporous effluent to condense hydrocarbons boiling at about 400° to 425° F., separating condensed hydrocarbons from uncondensed hydrogen-containing second reaction zone vaporous effluent to produce a dry hydrogen-containing recycle gas having a dew-point not higher than 40° F. comprising hydrogen-containing recycle gas from said second reaction zone and net hydrogen produced in said second reaction zone, recycling a portion of the so-produced dry recycle gas amounting to about the equivalent of said net hydrogen produced to said first reaction zone, and recycling the balance of the so-produced dry recycle gas to said second reaction zone.

2. A method of reforming hydrocarbons which comprises in a cyclic manner introducing particle-form solid reforming catalyst containing in excess of 0.5 to 0.7 weight per cent of at least one of water and loosely bound oxygen into a first reaction zone of a plurality of reaction zones under reforming conditions of temperature and pressure, flowing said catalyst downwardly through said first reaction zone from the point of introduction to a catalyst outlet in said first reaction zone, introducing into said first reaction zone near said catalyst outlet about 2 to about 20 per cent of a completely vaporized charge stock, comprising hydrocarbons to be reformed, together with an amount of a hydrogen-containing, dry recycle gas (obtained as hereinafter set forth) in excess of the net amount of hydrogen-containing gas produced in said first and a second reaction zone, and in the ratio of about 1 to about 8 mols of hydrogen per mol of said charge stock, flowing said completely vaporized charge stock and said recycle gas upwardly in contact with said downwardly flowing catalyst through said first reaction zone to produce a dry catalyst containing not more than 0.5 to 0.7 weight per cent of at least one of water and loosely bound oxygen and to produce a first reaction zone vaporous effluent comprising hydrocarbons boiling at about 400° to 425° F., water and recycle gas, introducing said dry catalyst into said second reaction zone, contacting in said second reaction zone said dry catalyst with the balance of said completely vaporized charge stock and the balance of said hydrogen-containing recycle gas (obtained as hereinafter set forth) to produce a second reaction zone vaporous effluent comprising hydrocarbons boiling at about 400°–425° F., said recycle gas and net hydrogen produced therein and concomitantly depositing coke on said catalyst, transferring said catalyst and deposited coke to a regenerator, burning-off at least a portion of said coke in said regenerator to produce reactivated catalyst containing in excess of 0.5 to 0.7 weight per cent of at least one of water and loosely bound oxygen, returning said reactivated catalyst to said first reaction zone, cooling said first reaction zone vaporous effluent to condense hydrocarbons boiling at about 400° to 425° F., separating condensed hydrocarbons from uncondensed first reaction zone vaporous effluent, discharging from the system an amount of said uncondensed first reaction zone vaporous effluent about equivalent to the aforesaid net hydrogen produced, drying the balance of said uncondensed first reaction zone vaporous effluent, cooling said second reaction zone vaporous effluent to condense hydrocarbons boiling at about 400° to 425° F., separating condensed hydrocarbons from uncondensed hydrogen-containing second reaction zone vaporous effluent to produce a dry hydrogen-containing recycle gas from said second reaction zone and net hydrogen produced in said second reaction zone, combining said uncondensed second reaction zone vaporous effluent with the aforesaid balance of said dried uncondensed first reaction zone vaporous effluent to produce the aforementioned recycle gas, recycling a portion of the so-produced dry recycle gas amounting to more than the equivalent of said net hydrogen produced and in a ratio of about 1 to about 8 mols of hydrogen per mol of completely vaporized charge stock introduced into said first reaction zone and recycling the balance of the so-produced dry recycle gas to said second reaction zone.

3. A method of reforming hydrocarbons which comprises in a cyclic manner introducing particle-form solid reforming catalyst containing in excess of 0.5 to 0.7 weight per cent of at least one of water and loosely bound oxygen into a first reaction zone of a plurality of reaction zones under reforming conditions of temperature and pressure, flowing said catalyst downwardly through said first reaction zone from the point of introduction to a catalyst outlet in said first reaction zone, introducing into said first reaction zone near said catalyst outlet about 20 to about 50 per cent of a completely vaporized charge stock, comprising hydrocarbons to be reformed, together with an amount of a hydrogen-containing, dry recycle gas (obtained from a second reaction zone as hereinafter set forth) sufficient to provide about 1 to about 8 mols of hydrogen per mol of said completely vaporized charge stock, flowing said completely vaporized charge stock and said recycle gas upwardly in contact with said downwardly flowing catalyst through said first reaction zone to produce a dry catalyst containing not more than 0.5 to 0.7 weight per cent of at least one of water and loosely bound oxygen and to produce a first reaction zone vaporous effluent comprising hydrocarbons boiling at about 400° to about 425° F., water and recycle gas and net hydrogen produced therein, introducing said dry catalyst into a second reaction zone, contacting in said second reaction zone said dry catalyst with the balance of said completely vaporized charge stock and the balance of said hydrogen-containing recycle gas (obtained from said first reaction zone as hereinafter set forth) to produce a second reaction zone vaporous effluent comprising hydrocarbons boiling at about 400°–425° F., said recycle gas and net hydrogen produced therein and concomitantly depositing coke on said catalyst, transferring said catalyst and deposited coke to a regenerator, burning-off at least a portion of said coke in said regenerator to produce reactivated catalyst containing in excess of 0.5 to 0.7 weight per cent of at least one of water and loosely bound oxygen, returning said reactivated catalyst to said first reaction zone, cooling said first reaction zone vaporous effluent to condense hydrocarbons boiling at about 400° to 425° F., separating condensed hydrocarbons from uncondensed first reaction zone vaporous effluent, discharging from the system an amount of said uncondensed first reaction zone vaporous effluent about equivalent to the net hydrogen produced in said first reaction zone, drying at least a portion of the balance of said uncondensed first reaction zone vaporous effluent and mixing said dried portion and the undried portion of said balance of said uncondensed first reaction zone vaporous effluent to produce a first reaction zone recycle gas having a dew-point not higher than 40° F., cooling said second reaction zone vaporous effluent to condense hydrocarbons boiling at about 400° to 425° F., separating condensed hydrocarbons from uncondensed hydrogen-containing second reaction zone vaporous effluent to produce a second reaction zone hydrogen-containing recycle gas having a dew-point not higher than 40° F. comprising hydrogen-containing recycle gas from said second reaction zone and net hydrogen produced in said second reaction zone, recycling said first reaction zone recycle gas having a dew-point not higher than 40° F. to said second reaction zone, and recycling said second reaction zone recycle gas having a dew-point not higher than 40° F. to said first reaction zone.

4. A method of reforming hydrocarbons which comprises in a cyclic manner introducing particle form solid reforming catalyst containing in excess of 0.5 to 0.7 weight per cent of at least one of water and loosely bound oxygen into a first reaction zone of a plurality of reaction zones under reforming conditions of temperature and pressure, flowing said catalyst downwardly through said first reaction zone from the point of introduction to a catalyst outlet in said first reaction zone, introducing into said first reaction zone near said catalyst outlet 2 to about 50 per cent of a completely vaporized charge stock, comprising hydrocarbons to be reformed, together with an amount of hydrogen-containing recycle gas having a dew-point not higher than about 40° F. (obtained as set forth hereinafter) at least equivalent to the net amount of hydrogen produced in said first reaction zone and in a second reaction zone and sufficient to provide about 1 to about 8 mols of hydrogen per mol of completely vaporized charge stock, flowing said completely vaporized charge stock and said recycle gas upwardly in contact with said downwardly flowing catalyst through said first reaction zone to produce a dry catalyst containing not more than 0.5 to 0.7 weight per cent of at least one of water and loosely bound oxygen and to produce a first reaction zone vaporous effluent comprising hydrocarbons boiling at about 400° to about 425° F., water, recycle gas and net hydrogen produced in said first reaction zone, introducing said dry catalyst into a second reaction zone, contacting in said second reaction zone said dry catalyst with the balance of said completely vaporized charge stock and an amount of recycle gas (obtained as set forth hereinafter) sufficient to provide about 1 to about 8 mols of hydrogen per mol of charge stock to produce a second reaction zone vaporous effluent comprising hydrocarbons boiling at about 400° to about 425° F., said recycle gas and net hydrogen produced therein and concomitantly depositing coke on said catalyst, transferring said catalyst and deposited coke to a regenerator, burning-off at least a portion of said coke in said regenerator to produce reactivated catalyst containing in excess of 0.5 to 0.7 weight per cent of at least one of water and loosely bound oxygen, returning said reactivated catalyst to said first reaction zone, cooling said first reaction zone vaporous effluent to condense hydrocarbons boiling at about 400° to 425° F., separating condensed hydrocarbons from uncondensed hydrogen-containing first reaction zone vaporous effluent, discharging an amount of said uncondensed first reaction zone vaporous effluent at least equal to the net hydrogen produced, drying at least a portion of the balance of said uncondensed first reaction zone vaporous effluent and mixing said dried and undried portions to produce a hydrogen-containing recycle gas having a dew-point not higher than about 40° F., cooling said second reaction zone vaporous effluent to condense hydrocarbons boiling at about 400° to about 425° F., separating condensed hydrocarbons from uncondensed hydrogen-containing second reaction zone vaporous effluent to produce a hydrogen-containing recycle gas having a dew-point not higher than 40° F., and recycling hydrogen-containing recycle gas having a dew-point not higher than 40° F. to said first and second reaction zones as aforesaid.

References Cited in the file of this patent

UNITED STATES PATENTS 2,364,453    Layng et al. _____ Dec. 5, 1944
2,419,517    Eastwood _____ Apr. 22, 1947

OTHER REFERENCES

Payne et al.: Petroleum Refiner, vol. 31, No. 5, May 1952, pages 117–123.